United States Patent
Milne et al.

(10) Patent No.: US 8,096,334 B2
(45) Date of Patent: Jan. 17, 2012

(54) SHALLOW WATER WOOD HARVESTER

(75) Inventors: Peter Daniel Milne, Sooke (CA); Richard Douglas Shipley, Powell River (CA)

(73) Assignee: Triton Logging, Inc., Saanichton, British Columbia (*) Notice: Subject to any disclaimer, the term of this patent is extended or adjusted under 35 U.S.C. 154(b) by 85 days.

(21) Appl. No.: 12/533,412

(22) Filed: Jul. 31, 2009

(65) Prior Publication Data
US 2011/0023999 A1 Feb. 3, 2011

(51) Int. Cl.
*A01G 23/08* (2006.01)
(52) U.S. Cl. .................. 144/335; 144/4.1; 144/34.1
(58) Field of Classification Search ............ 144/4.1, 144/34.1, 335, 336
See application file for complete search history.

(56) References Cited

U.S. PATENT DOCUMENTS

| 3,667,515 | A | | 6/1972 | Corey |
| 3,693,676 | A | | 9/1972 | Burch |
| 3,719,116 | A | * | 3/1973 | Burton et al. .............. 83/483 |
| 3,847,192 | A | | 11/1974 | Jorgensen |
| 4,168,729 | A | | 9/1979 | Tausig et al. |
| 4,306,597 | A | | 12/1981 | Nystrom |
| 4,579,157 | A | | 4/1986 | Lindblom |
| 4,680,879 | A | * | 7/1987 | Hill et al. .............. 37/331 |
| 4,802,517 | A | * | 2/1989 | Laster .............. 144/34.5 |
| 5,042,959 | A | * | 8/1991 | Tadatsu .............. 405/191 |
| 5,249,378 | A | * | 10/1993 | Frame .............. 37/342 |
| 5,375,348 | A | * | 12/1994 | Kishi .............. 37/186 |
| 5,613,537 | A | | 3/1997 | Gassiott |
| 5,655,584 | A | | 8/1997 | Glawson |
| 5,979,518 | A | | 11/1999 | Hamby |
| 6,024,145 | A | | 2/2000 | Ackles |
| 7,311,126 | B2 | | 12/2007 | Sharp |
| 7,320,349 | B2 | | 1/2008 | Gatz |
| 7,367,368 | B2 | | 5/2008 | Smitherman |
| 2007/0166144 | A1 | * | 7/2007 | Hall .............. 414/732 |

FOREIGN PATENT DOCUMENTS
CA 931048 7/1973
DE 10121739 11/2002

OTHER PUBLICATIONS
International Search Report of PCT/CA2010/001183, International Filing Date: Jul. 28, 2010.

* cited by examiner

*Primary Examiner* — Shelley Self
(74) *Attorney, Agent, or Firm* — Gardner Groff Greenwald & Villanueva, P.C.

(57) ABSTRACT

A device and methods for harvesting submersed wood are provided. The device comprises, a machine operatively associated with a movable boom member rotatably attached. A telescoping stick having a first and second end is pivotally attached to the movable boom in a mid portion of the stick. The second end of the telescoping stick is attached to a wood gripping-cutting head. The telescoping stick is moveable to an operative position so that the second end extends below a plane defined by a surface the machine is located upon. When in use, the second end may extend into water located below the plane defined by the surface the machine is located upon. The device may be used on land, a dock, and a wharf adjacent a water edge, or the device may be located on a floating platform.

13 Claims, 8 Drawing Sheets

SHALLOW WATER WOOD HARVESTER

FIELD OF INVENTION

This invention relates to a device for harvesting submersed timber. More particularly, the invention relates to a device comprising a telescoping stick. The invention also relates to methods of harvesting submersed wood using the device.

BACKGROUND OF THE INVENTION

Flooding of forested valleys by reason of natural causes or by reason of hydroelectric damming may provide a source of submerged free standing trees. A substantial percentage of the submerged free standing trees are within depths of approximately 100 feet of water and so are available to be harvested given an appropriate log cutting and retrieval mechanism.

It is known to provide a vessel, such as a barge, for floating on the surface of the water, with a mounted boom capable of extending under the water surface to cut underwater trees or stumps. A stump cutting apparatus for use underwater is described, for example, in U.S. Pat. No. 5,613,537, issued to Gassiott. U.S. Pat. No. 5,655,584, issued to Clawson describes an amphibious feller-buncher for use in cutting stumps in swampland.

U.S. Pat. No. 6,024,145, issued to Ackles describes an articulated boom mounted to a free floating platform that can be used to manipulate objects under water. This articulating boom is comprised of multiple folding sections that unfold as the wood gripping-cutting head is extended towards the base of a tree to be harvested. The articulating boom requires a large volume of space around the tree so that the arm can unfold without hitting underwater obstructions, and it can not be used effectively in reservoirs with densely packed trees or thick tree canopies.

U.S. Pat. No. 3,667,515 (Corey) and U.S. Pat. No. 4,168,729 (Tausig et al.), teach a pile cutting device for use in locations remote from the operator. A pile cutter is suspended on a cable so that it can be lowered by means of a crane to a desired depth. However, grappling logs with such a system is a very difficult task as there is no rigid connection between the crane and the wood gripping-cutting head. Furthermore, while attachment of the cutting head to a cable is suitable for use in still water, currents may affect positioning the cutting head underwater. In addition, feeding the cutting head through branches of the tree canopy is difficult.

U.S. Pat. No. 3,693,676 issued to Burch, describes an underwater pile cutting saw attached to a rigid tubular housing enclosing a drive shaft. The rigid tubular member (stick) is of a fixed length. Submersed tree harvesting devices with a non sectioned stick are severely constrained regarding the depth they can harvest. If the stick is long, then manipulating and storing the logs at the surface is difficult as the entire length of the stick in addition to the wood needs to be maneuvered.

SUMMARY OF THE INVENTION

This invention relates to a device for harvesting submersed timber. More particularly, the invention relates to a device comprising a telescoping stick. The invention also relates to methods of harvesting submersed wood using the device.

The present invention provides an improved shallow water wood harvester.

The present invention provides a device for harvesting submersed wood comprising a machine operatively associated with a movable boom member having a base end pivotally attached to the machine, and a pivot end, a telescoping stick having a first, a second end, and a mid portion, the mid portion pivotally attached to the pivot end of the movable boom member, the second end attached to a wood gripping-cutting bead, the telescoping stick moveable to an operative position so that the second end extends below a plane defined by a surface the excavator is located upon. The second end may extend into water located below the plane defined by a surface the device is located upon. Furthermore a sonar, video or other orienting system may be located at or near the second end to assist in positioning of the wood gripping-cutting head. The sonar, video or other orienting system may be located in wood gripping-cutting head.

The present invention also provides a device for harvesting submersed wood comprising a floating platform having a top, a bottom and one or more than one side, a movable boom member having a base end and a pivot end, the base end of the movable boom member mounted to the top of the floating platform, a telescoping stick having a first end, a second end, and a mid portion, the mid portion pivotally attached to the pivot end of the movable boom member, the second end attached to a wood gripping-cutting head, the telescoping stick moveable to an operative position so that the second end may extend below a plane defined by a surface the floating platform is located upon. Furthermore a sonar, video or other orienting system may be located at or near the second end to assist in positioning of the wood gripping-cutting head. The sonar, video or other orienting system may be located in wood gripping-cutting head.

The present invention provides a method for harvesting submersed wood comprising a) positioning, on a land surface and adjacent a water edge, a device for harvesting submersed trees, the device comprising a machine operatively associated with a movable boom member having a base end pivotally attached to the machine and a pivot end, a telescoping stick having a first end, a second end, and a mid portion, the mid portion pivotally attached to the pivot end of the movable boom member, the second end attached to a wood gripping-cutting head, the telescoping stick moveable to an operative position;

b) extending the telescoping stick so that at least the second end enters the water;

c) engaging the wood gripping-cutting head with a submersed wood;

d) cutting the submersed wood using the wood gripping-cutting head; and e) retrieving the submersed wood.

Furthermore a method for harvesting submersed wood is provided comprising a) providing a device comprising a floating platform having a top, a bottom and one or more than one side, a movable boom member having a base end and a pivot end, the base end of the movable boom member pivotally and rotatably mounted to the top of the floating platform, a telescoping stick having a first end, a second end, and a mid portion, the mid portion pivotally attached to the pivot end of the movable boom member, the second end attached to a wood gripping-cutting head, the telescoping stick moveable to an operative position;

b) engaging the gripping-cutting head with a submersed wood;

c) cutting the submersed wood using the wood gripping-cutting head; and d) retrieving the submersed wood.

By using a wood harvesting device that comprises a telescoping stick as described herein, submerged wood within dense underwater tree stands, that are inaccessible using a folding stick, can be harvested. Since the stick telescopes as it descends and ascends in a linear path that may be vertical or on an angle, as required, this makes it easier to travel through canopies. The linear path also means the time to descend and ascend is relatively quick, relative to cable or folding stick systems. The telescoping stick may also reach depths not attainable using non-sectioned sticks. The length of the telescoping stick is also reduced at or near the surface of the water thereby assisting manipulation and storing of retrieved logs. The telescoping stick is also rigid and provides stability along the length of the stick, and is unaffected by underwater currents when in use.

Utilizing a telescoping stick provides a much larger range of operating depths when harvesting wood in submerged stands when compared to a fixed-length stick system, or a folding stick system in thick tree canopies. Since wood fibre that is exposed to air, as in protruding tops and tops within the range of reservoir level fluctuation, deteriorates, maximizing the reach of a shallow water system is very important.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

This invention relates to a device for harvesting submersed timber. More particularly, the invention relates to a device comprising a telescoping stick. The invention also relates to methods of harvesting submersed wood using the device.

Figure 1:
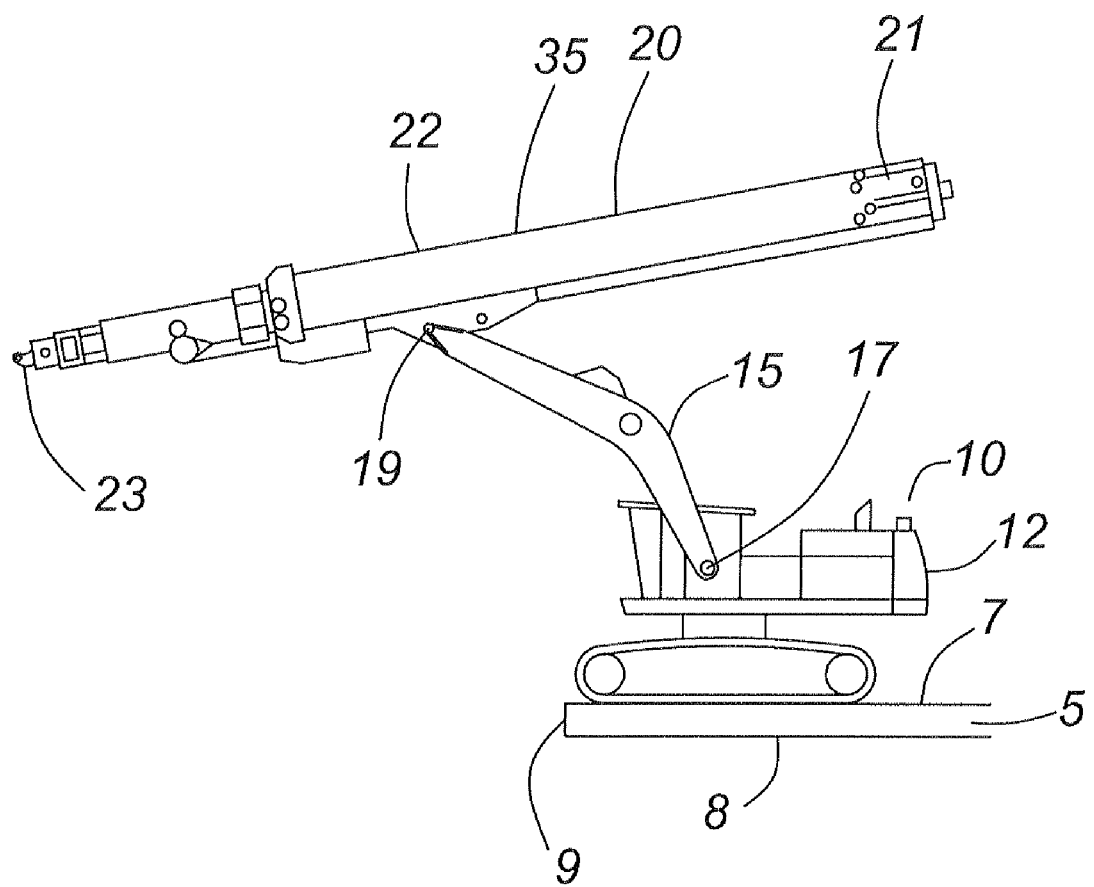
FIG. 1 shows a device for harvesting submersed wood in accordance with an embodiment of the present invention.

With reference to FIG. 1, there is shown a non-limiting example of a device for harvesting submersed wood, for example, trees, wooden piles or other submerged wooden items. The device generally includes a machine, for example but not limited to an excavator (10), hydraulic log loader, or like machine, operatively associated with a movable boom member (15) having a base end (17) pivotally mounted to the device, for example, an upper frame of the excavator (10) or hydraulic log loader, and a pivot end (19), a telescoping stick (20) having a first (21) and a second end (23), and a mid portion (22) between the ends of an outer section (35) of the telescoping stick, the mid portion (22) pivotally attached to the pivot end of the movable boom member (19), the second end (23) of the telescoping stick pivotally attached to a utility head (25), for example a wood gripping-cutting head. The telescoping stick (20) is moveable to an operative position, for example but not limited to a vertical or near vertical position, or at an angle required to access the submerged wood, for example from approximately 45° to 90° or any amount therebetween, relative to the horizon, so that when in use, the second end (23) may extend into water that is located below a plane defined by a surface the excavator is located upon. In use the telescoping stick may be entirely submerged, along with a portion of the boom member.

A sonar, one or more than one video, or other device to assist with the positioning or orientation of the utility head (25) may be located at or near the second end of the telescoping stick (23), or in the utility head, to assist in positioning of the wood gripping-cutting head when in use.

The machine used with the device of the present invention may be any excavator known in the art, a tractor, or backhoe, or hydraulic log loader or other like machine. The invention is not limited by the type of power source, tractor, backhoe, hydraulic loader or excavator used.

The machine, for example an excavator (10), hydraulic log loader, or like machine, coupled to the boom member (15) and telescoping stick (20) may be positioned on solid ground, a wharf, a dock, or other surface adjacent a water edge, for retrieving submerged wood near a shoreline, or for retrieving submerged wood adjacent the wharf, dock, or other surface. The excavator (10), hydraulic log loader, or like machine coupled to the boom member (15) and telescoping stick (20) may also be positioned on a floating platform or barge (5) for use off-shore. Alternatively, the body of an excavator (12), hydraulic log loader, or like machine, coupled to the boom member (15) and telescoping stick (20) may be fixed to a floating platform or barge (5) for use off-shore.

By having the device operate on a surface adjacent a water edge, this invention provides a method for harvesting submersed wood from the water in the region of the waters edge. This method comprises positioning on solid ground, a wharf, a dock, or other surface adjacent a water edge, and adjacent a water edge, an excavator (10), hydraulic log loader, or like machine, with a movable boom member having a base end rotatably attached to the excavator or hydraulic loader and a pivot end, a telescoping stick having a first end, a second end, and a mid portion between the ends of an outer section (35) of the telescoping stick, the mid portion pivotally attached to the pivot end of the movable boom member, the second end attached to a wood gripping-cutting head, the telescoping stick moveable to an operative position, for example but not limited to a vertical or near vertical position, or at an angle required to access the submerged wood, for example from approximately 45° to 90° or any amount therebetween, relative to the horizon. The boom member is positioned so that the telescoping stick is located above water, and the telescoping stick is extended so that at least the second end enters the water. The wood gripping-cutting head is then engaged with submersed wood, the submersed wood is cut using the wood gripping-cutting head, and the submersed wood retrieved. This method may also comprise a step of locating the submersed wood using a video system, a sonar system, or a combination of video and sonar systems. In use the telescoping stick may be entirely submerged, along with a portion of the boom member.

The machine, for example an excavator (10), hydraulic log loader, or like machine, may be mobile, comprising tracks or wheels, so that it can be moved on and off the floating platform (5). Alternatively, the body of an excavator (12), or any like device having a power source and hydraulic system to manipulate the boom member (15) and telescoping stick (20), may be rotationally fixed to the top of the platform (7) thereby making a dedicated floating wood harvesting device.

The floating platform (5) has a top (7), a bottom (8) and one or more than one side (9). A side of the barge (80; FIG. 6) may be curved, having a radius similar to the radius defined by the telescoping stick (20) in a vertical position so that, when excavator, hydraulic log loader, or like machine, or excavator body or like machine, is rotated, the boom member/telescoping stick circumscribe an arc about a horizontal plane.

By the term "telescoping stick" is meant the movement of one part sliding out from another, lengthening the stick from its rest state. The telescoping stick (20) consists of two, three, four or more than four sections depending upon the length the telescoping stick is to extend. The sections allow the utility head to be descended in a linear path into a desired depth for harvesting submersed trees and stumps. It will be understood that the telescoping stick may be provided having a different number of sections, and still be capable of providing this function, to a greater or lesser degree. Telescoping sticks that may be used as described herein are available from Long Reach High Reach (LRHR LLC., Mt Laurel. N.J.).

Figure 2:
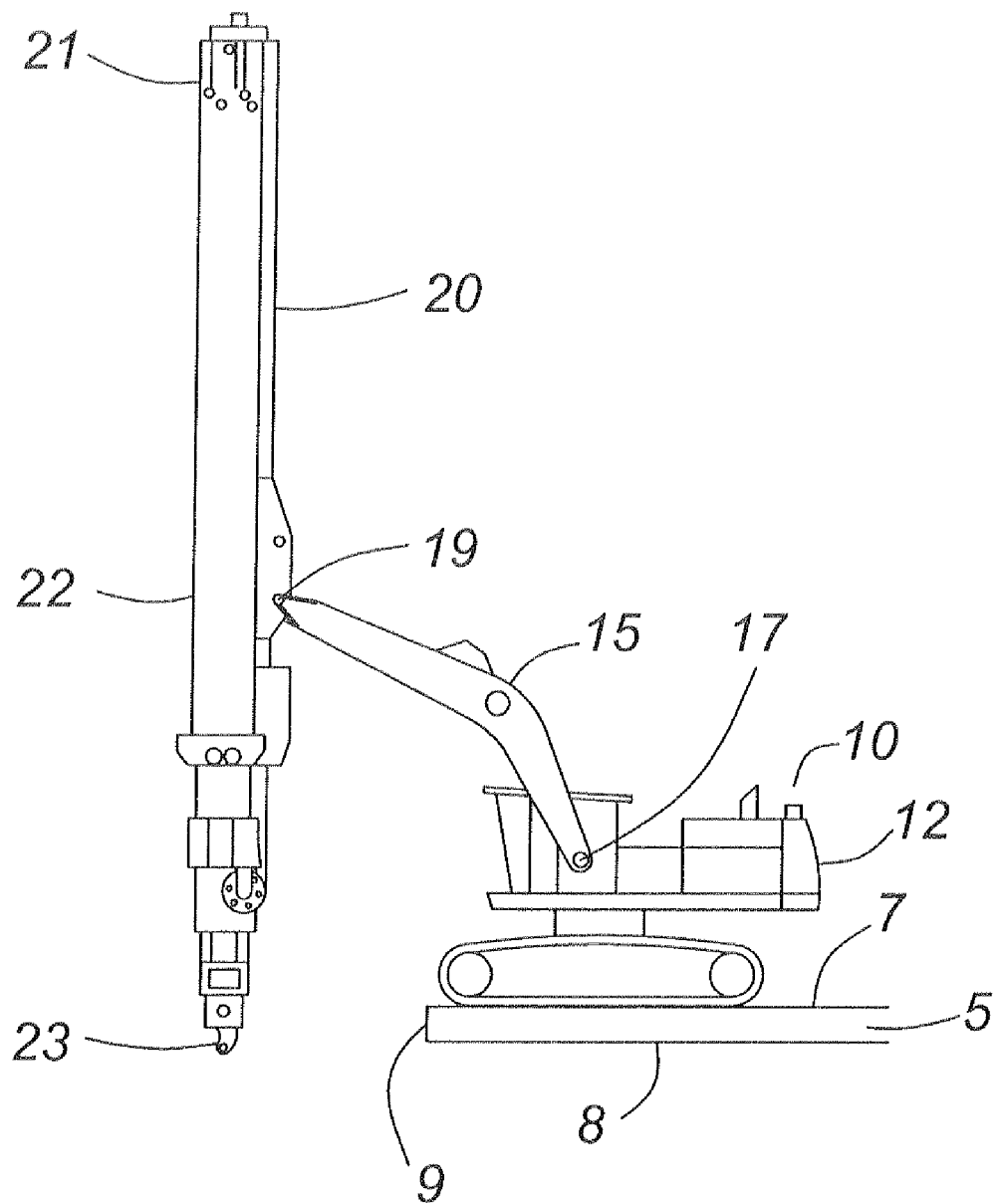
FIG. 2 shows a device for harvesting submersed wood in a working position in accordance with an embodiment of the present invention.

The telescoping stick (20) is pivotally mounted, for example at the mid portion (22) between the ends of an outer section (35) of the telescoping stick, to the pivot end (19) of the boom member (15). The other end of the boom member is pivotally mounted at its base end (17) to an excavator (10), hydraulic log loader, or like machine, or excavator body (12). Articulation of the boom member allows the telescoping stick to be moved from a horizontal position (FIG. 1), to a vertical work position (FIG. 2). Valves are mounted near the second end of the telescoping stick and are connected to hydraulic lines, which are omitted from the drawings herein for clarity. The hydraulic lines extend to hydraulically-driven cylinders and hydraulically driven motors on the boom member (15), telescoping stick (20) and utility head (25). The hydraulic lines are fed by a pressurized fluid source, not shown, within the machine or excavator (10), or the pressurized fluid source may be mounted on the floating platform. The hydraulic lines are operatively linked to a control unit (not shown), as would be known to one of skill in the art. Furthermore, a cable drive system to assist in manipulation of the telescoping stick may be used in conjunction with the hydraulic system, or if desired, in place of the hydraulic system.

The operator of the device may be located on the floating platform, or machine, for example an excavator (10), hydraulic log loader, or like machine, and operate the boom member (boom member; 15), telescoping stick (20) and utility head (25) via the control unit. Alternatively, the operator may operate the device remotely, and be operatively linked by way of a radio signal to the control unit, using methods as would be known to one of skill in the art. In this way, the floating platform with an excavator (10), hydraulic log loader, or like machine, operatively associated with a boom member (15), telescoping stick (20) and utility head (25) may be operated, for example, from shore, another floating platform, or from a boat.

The hydraulic lines are preferably housed within the interior of the telescoping stick (20) and the boom member (15) or within holders mounted to the telescoping stick and boom member that allow the lines to accommodate the pivotal and rotational movement and extensions of the telescoping stick and boom member. It will be understood that although the preferred embodiment employs a hydraulic drive system, the device may be driven by any means capable of providing sufficient motivating force to drive the telescoping stick and boom member and utility head. For example, the hydraulics could be replaced by an air or cable driven system, or an arrangement of electric motors, as long as these are compatible with submersed operations.

The utility head on the telescoping stick can be descended to a depth of up to about 200 ft. Preferably the utility head is descended to a depth to about 100 ft. The device can be used in a depth of about 10 ft, 20 ft, 30 ft, 40 ft, 50 ft, 60 ft, 70 ft, 80 ft or 90 ft, or any depth therebetween.

Figure 3:
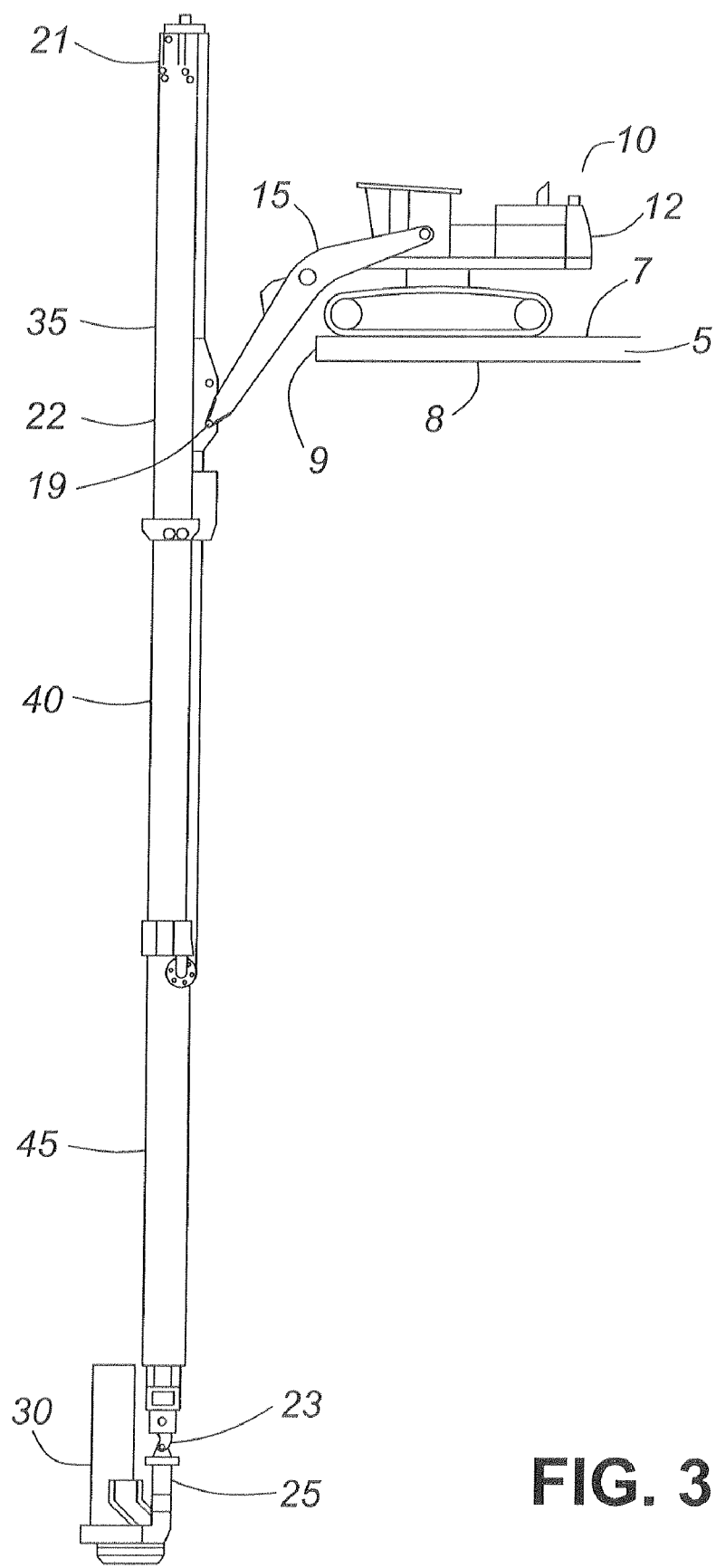
FIG. 3 shows a device for harvesting submersed wood with the telescoping stick extended in accordance with an embodiment of the present invention.

The embodiment illustrated in FIG. 3 shows a telescoping stick comprising three sections that are movable relative to each other. An outer section (35) surrounds a median section (40) which, in turn, surrounds an inner section (45). The outer section (35) is attached to the boom member (15) at the mid portion (22). The mounting of the mutually displaceable telescoping sections 35, 40 and 45 on each other is effected in well-known way and, therefore, is not described in detail. The outer telescoping section (35) may be box-shaped, of rectangular cross section and accommodate a median telescoping section (40) also of rectangular cross section. An inner telescoping section (45), also of substantially rectangular cross section is telescoped in the also box-shaped median telescoping section (40). However, the cross section of the outer (35), median (40) and inner (45) telescoping sections may be of any shape, for example but not limited to circular, or triangular.

The telescoping stick descending and ascending motion may be powered by one or more than one hydraulic motor supplied with fluid under pressure from one or more than one hydraulic pump. The descending and ascending movement of the sections of a telescoping stick may also be actuated using chains, cables or a combination thereof. Furthermore, the descending and ascending movement of the telescoping stick may be controlled by the use of a combination of hydraulic cylinders, chains and cables.

Figure 4A:
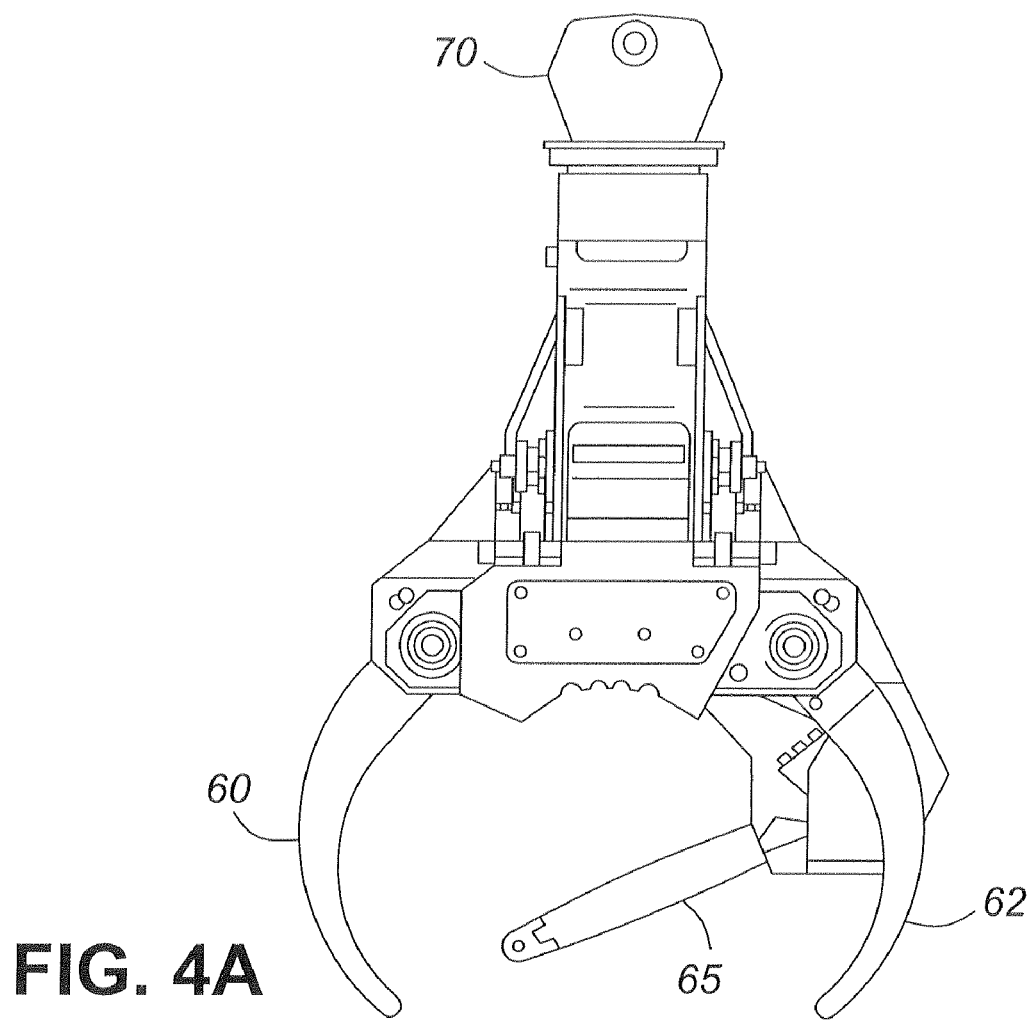
FIG. 4A shows a schematic plan view of the utility head (wood gripping-cutting head). 4B shows a schematic front view of a utility head used in accordance with an embodiment of the present invention.
Figure 4B:
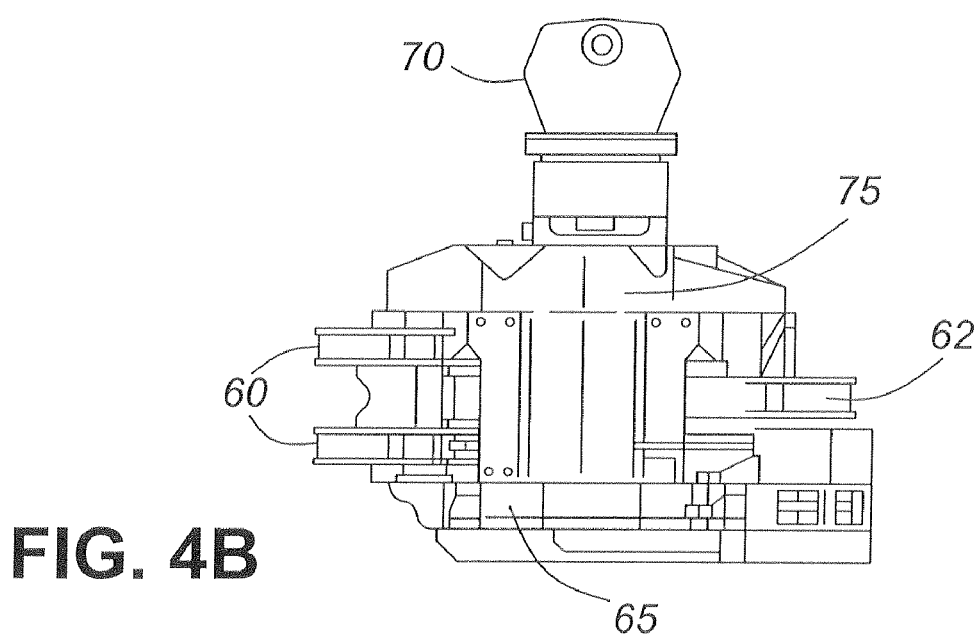
Figure 5:
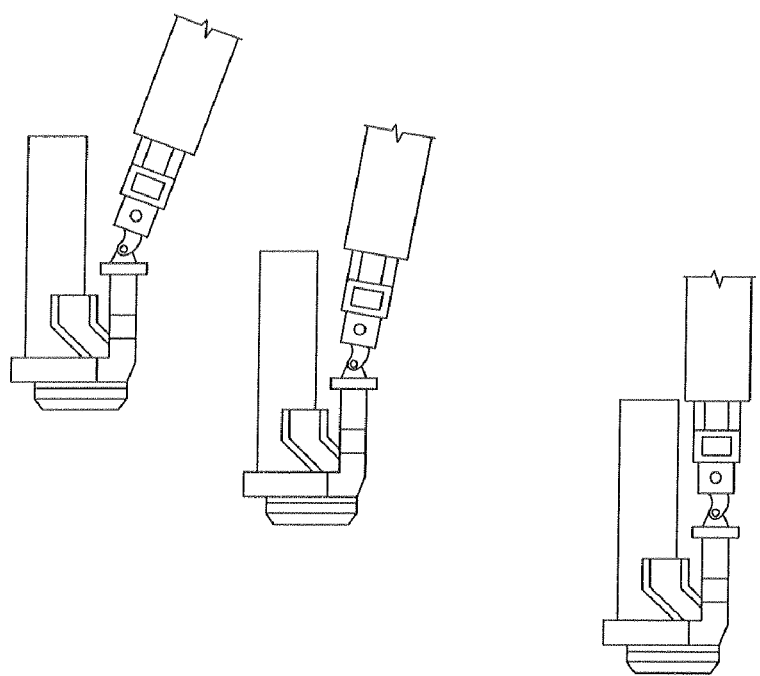
FIG. 5 shows the rotation of the utility head

A utility head, is pivotally attached to the second end of the telescoping stick (23). The utility head typically comprises a felling head with grapple arms. Felling heads for cutting wood or trees are well known, as are felling heads that both cut and manipulate poles, or trees. Any felling head or wood gripping-cutting head, suitable for underwater use may be used. The felling head typically has arms or other means for gripping the tree or wood (grapple; 60, 62; FIG. 4) and a saw or wood shearing device (65), provided in the head, for cutting the wood.

The saw may be any suitable saw, for example a chain saw or rotary saw, and may be powered hydraulically. The saw may be moved in a pivotal or slidable manner relative to the grapple arms, in order to cut through the wood. The head should be capable of being oriented in a desired position, in order to grip and cut a limb or tree in any position. In order to achieve these objects, the head may be mounted on the telescoping stick, with a linkage (70) that permits the head to both pivot and rotate in any orientation. Preferably, the head should be continuously rotatable relative to the telescoping stick; this requires the use of a rotary drive coupling to permit the hydraulic lines or other drive and control means driving the head to be coupled with the telescoping stick.

The curved grapple arms (60, 62) are pivotally coupled to a grapple frame (75). Pivoting movement of the grapple arms is driven by a hydraulic system. The grapple arms can be opened to an extended position to engage a submerged tree or other wood, and then closed by pivoting inward to grip the submerged wood therebetween. The right grapple arm may be comprised of two arms (60) extending in parallel planes, and the left grapple arm may be comprised of a single extending arm (62) and a saw (65) which is mounted underneath the left arm. However, other numbers of grapple arms may also be used.

Non limiting examples of a utility head include a grapple saw (ROTOBEC™; Roto Cut Saw System), a harvester head available from LOG MAX, a felling head/grapple—630 Felling Grapple from SATCO®, or for example, a combination of a grapple head with a cut off saw as described in U.S. Pat. No. 7,311,126, U.S. Pat. No. 5,979,518, or U.S. Pat. No. 4,306,597 (which are herein incorporated by reference).

One or more than one orientation system, for example a video, sonar system, or a combination thereof, may be mounted separately or together, to the utility head, or at or near the second end of the telescoping stick. The one or more than one orientation system enables an operator to survey the submerged region, identify wood for processing, and monitor positioning and operation of the utility head remotely in real time while submerged. For example, without intending to be limiting, the orientation system may incorporate one or more than one video camera. An external light source may also be associated with the video camera(s). The field of view of the video camera(s), or sonar system, may encompass an area including the area between the arms and in a forward direction along the arms a head of the utility head. If desired, the one or more than one orientation system may be manipulated or rotated from side to side or up and down, as may be required to assist in visualizing grappling and cutting of submerged wood. The video camera may be enclosed in a protective housing. A scanning sonar, or a multi-beam sonar, may be used in clear or murky waters with low or zero visibility. Non-limiting examples for a orientation system include a scanning sonar, MS 1000, from Konsberg Mesotech Ltd (Port Coquitlam BC), and a multi-beam sonar, Model 837, Delta T, from Imagenex.

The floating platform or barge may comprise essentially any form of structure which may be floated on the surface of the water. For example, the platform may be formed of an assembly of flotation sections secured together for supporting the machine (10), excavator or like machine, or excavator body (12) and other equipment on the surface of the water. In an preferred embodiment the platform is a barge. The floating platform or barge of the present invention is self-contained, capable of maintaining its station over extended periods of time, and capable of operating in adverse weather conditions. The barge further supplies sufficient support for cutting a submersed tree.

Figure 6A:
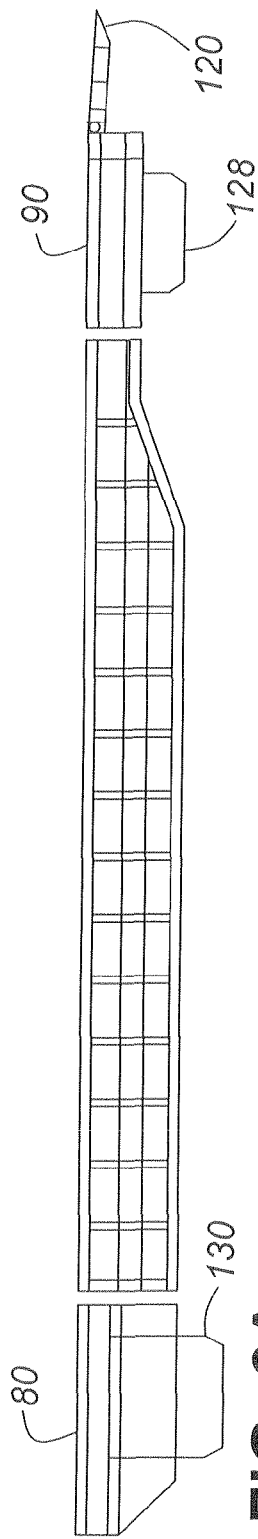
FIG. 6A shows a schematic side elevation view of the barge. 6B shows a schematic plan view of the deck of the barge in accordance with an embodiment of the present invention.
Figure 6B:
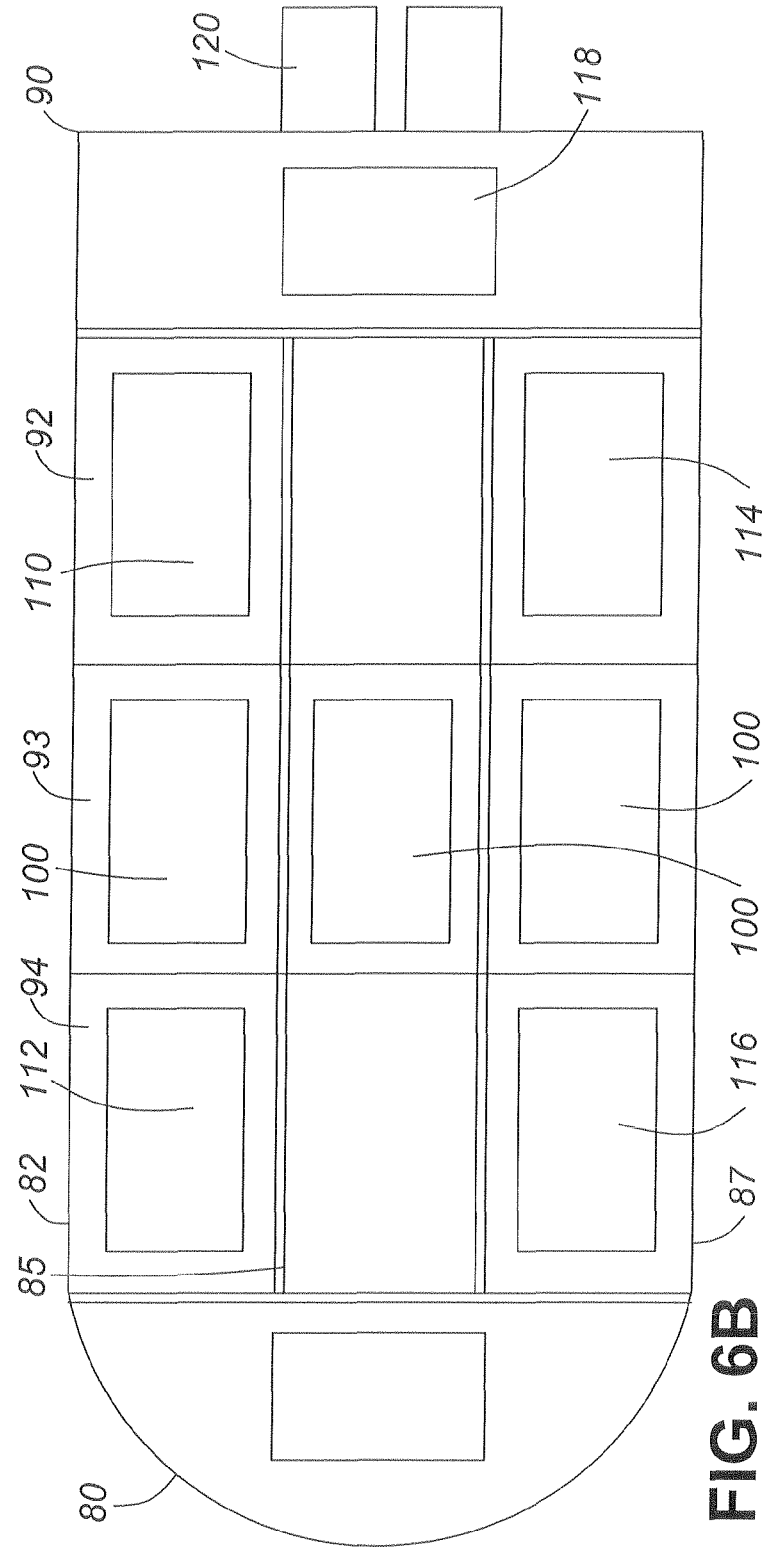
Figure 7:
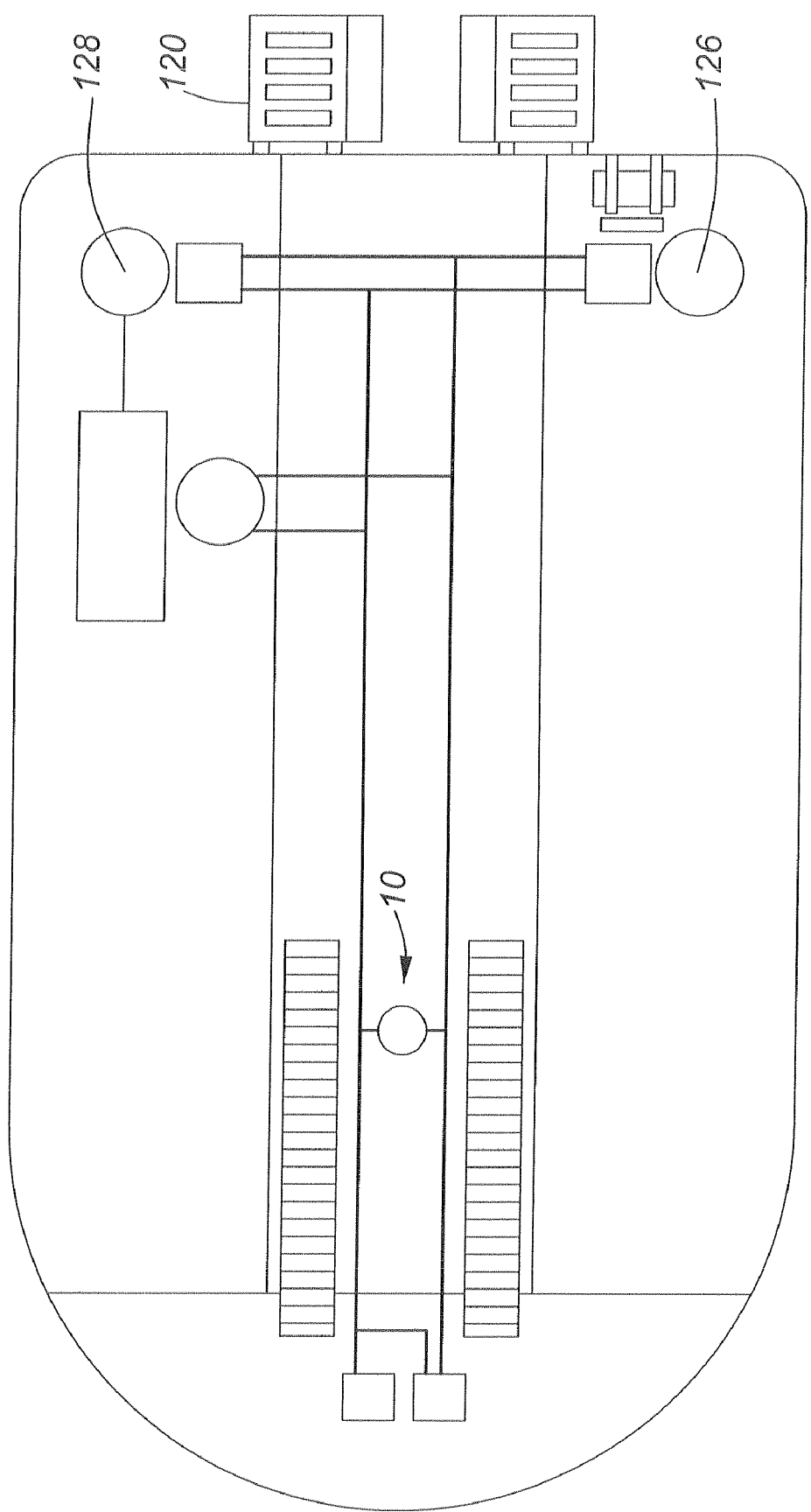
FIG. 7 shows a plan view of the barge in accordance with an embodiment of the present invention.
Figure 8:
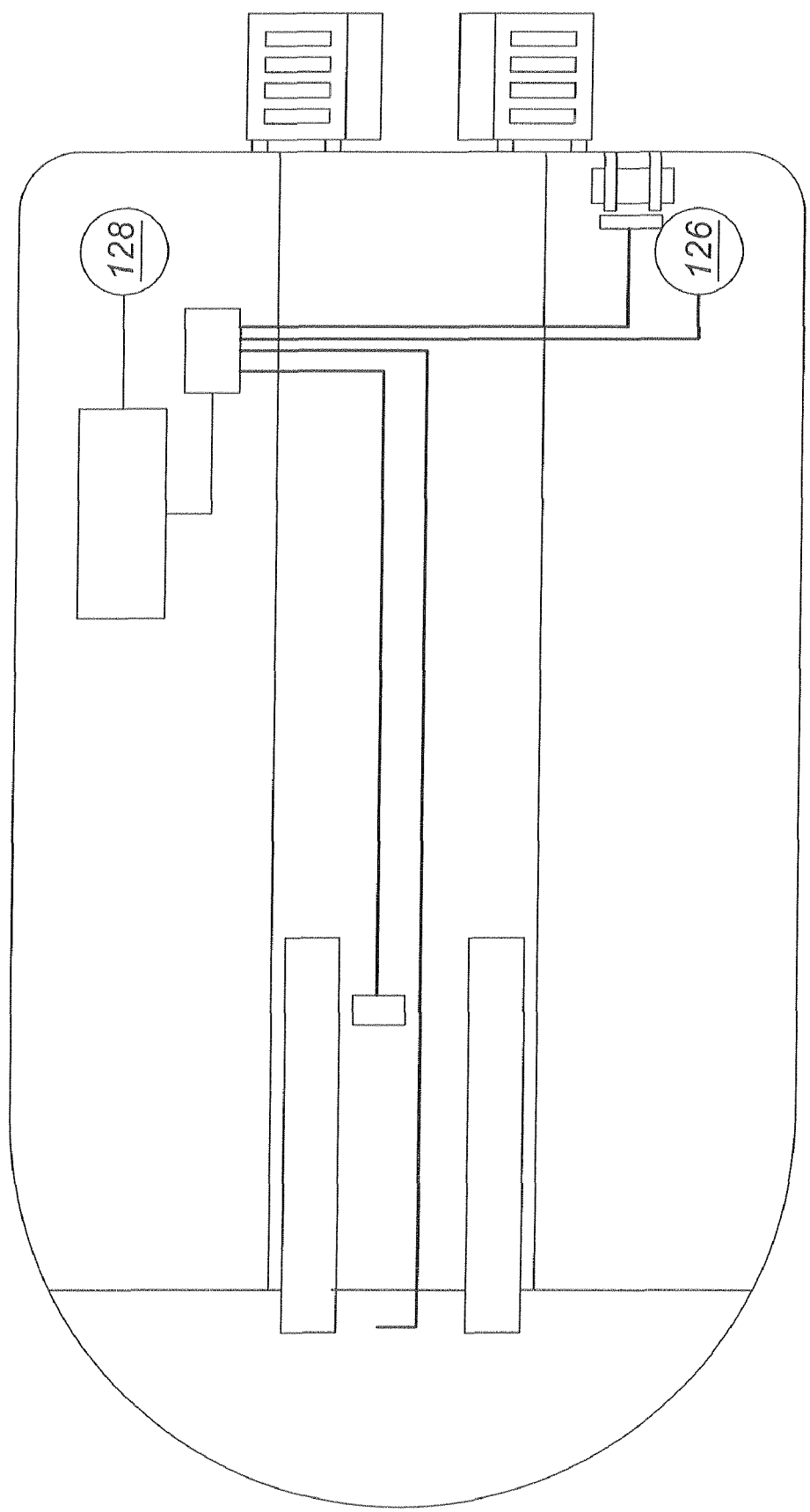
FIG. 8 shows a plan view of the barge in accordance with an embodiment of the present invention.

A non-limiting example of a barge is shown in FIGS. 6-8. The barge may be comprised of multiple air-tight compartments fastened together. The multiple compartments ensures flotation of the platform if one of the compartments is damaged, and permits disassembly for transport of the floating platform to different work sites. The flotation platform is designed to be sufficiently sturdy to support the machine, for example an excavator, hydraulic log loader, or like machine, associated equipment, and supplies.

As seen in FIGS. 6-8, the flotation platform may comprise a bow section (80), starboard center section (82), midship center section (85), port center section (87) and stern section (90). The starboard center section, the midship center section and the port center section each comprise one, two, three, or four compartments. In the example shown in FIG. 6, three compartments per starboard, midship and port center sections are shown; a stern (92), a center (93) and a bow compartment (94). The bow and stern section comprise at least one compartment. Each compartment may comprise one or more than one watertight access hatch (not shown). A ramp or multiple ramps (120) may be provided for moving an excavator (10), hydraulic log loader, or like machine, on and off the barge.

The excavator (10), hydraulic log loader, or like machine, or excavator body (12), or like machine, is positioned on the midship center section, and the bow section (80; see FIGS. 6A and 6B). The bow section is of semi circular shape. This shape is advantageous in maximizing the water surface area that the radius of the boom member with the telescoping stick can reach.

The barge may comprise one or more than one fuel tank (100) and one or more than one ballast tank (110, 112, 114, 116, 118). Preferably the fuel tanks are made from aluminum and the ballast tanks are made from steel. For example, which is not to be considered limiting, three fuel tanks may be installed amidships in the starboard center section, the midship center section and the port center section. The tanks may be interconnected with the use of check valves at the bottom of the tank to allow cross flow into the center tank but not from the center tank to the outboard tanks fuel lines (not shown).

The barge may also comprise one or more than one ballast tank (112), for example, 1, 2, 3, 4, 5, 6, 7, 8, 9, or 10 ballast tanks, or any number therebetween. In the example presented in FIG. 6, five ballast tanks are shown. The tanks may be distributed as follows: starboard center section aft tank (110) and a starboard center section bow tank (112), port center section aft tank (114) and a port center section bow tank (116) a stern section tank (118).

Water may be pumped into and out of selected ballast tanks to adjust fore/aft trim and port/starboard list. The ballast system compensates for changes in weight distribution during operation, loading and unloading of the barge. The water ballast system counterbalances on-board loads and otherwise improves stability in adverse winds, waves, and currents. The water ballast system may comprise appropriate sensors and pumps, including the water level in each tank, in this manner the trim and list of the platform may be controlled by an on-board, or off-board, computer or CPU.

Turning to FIGS. 6A and 8, the barge is provided with a propulsion system for transport, and to allow the barge to stay stationary in a predetermined location over an extended period. For example, the barge has two thrusters mounted in the stern section; a port thruster (126) and a starboard thruster (128). A bow thruster (130) is mounted centrally in the bow section. Preferably the thrusters are azimuth thrusters that can be rotated in any horizontal position and provide steering.

The barge may be further equipped with an echo sounder. A through hull tube is provided at the midship center section (85) to allow installation of an echo sounder. The echo sounder can be used to locate trees and to measure the depth of the water. The echo sounder can be further used to locate and avoid submersed obstacles.

To ensure that the barge remains stationed over extended period and under conditions that exert lateral pressure to the submersed telescoping stick, the barge may utilize a global positioning system (GPS) or other analogous system for example a satellite or ground based navigation system, operatively linked to the propulsion system. For example, a GPS or other sensor capable of receiving GPS or other signals from GPS satellites or like system (not shown) is coupled to a transmitter for transmitting the location of barge. The GPS, or like system, is operatively coupled to the thrusters of the barge, which in turn ensure that the barge stays stationary. If the device for harvesting submersed wood of the present invention is operated remotely, then the positional information received from the GPS or like system may also be obtained and processed remotely from the floating platform, and the instructions provided to the platform as required.

The barge maybe further equipped with a wind sensor to measure wind direction and speed, a compass, water current sensor, machine rotational speed, acceleration, position, and a telescoping stick depth sensor to determine the length of stick within the water.

The present invention therefore also provides a method for harvesting submersed wood comprising: providing a floating platform having a top, a bottom and one or more than one side, a movable boom member having a rotatable base end and a pivot end, the base end of the movable boom member mounted to the top of the floating platform, an excavator, or hydraulic log loader, a telescoping stick having a first end, a second end, and a mid portion, the mid portion pivotally attached to the pivot end of the movable boom member, the second end attached to a wood gripping-cutting head, the telescoping stick moveable to an operative position. The floating platform can be positioned where desired, and the telescoping stick positioned so that at least the second end enters the water. The gripping-cutting head engages the submersed wood, and the submersed wood is cut using the wood gripping-cutting head. The submersed wood is then retrieved. This method may also comprise a step of locating the submersed wood using a video system, a sonar system, or a combination of video and sonar systems. This method may also comprise a step of maintaining the location of the floating platform using a GPS system. Furthermore, this method may comprise one or more steps that are required to manipulate the position of the floating platform, and manipulate the movement of the boom member, telescoping stick, and gripping-cutting head, where the one or more steps are operated from a location that is remote to that of the location of the floating platform.

All citations are hereby incorporated by reference.

The present invention has been described with regard to one or more embodiments. However, it will be apparent to persons skilled in the art that a number of variations and modifications can be made without departing from the scope of the invention as defined in the claims.

What is claimed is:

1. A device for harvesting submersed wood comprising, a machine operatively associated with a movable boom member having a base end pivotally attached to the machine, and a pivot end, a telescoping stick having a first, a second end, and a mid portion, the mid portion pivotally attached to the pivot end of the movable boom member, the second end attached to a wood gripping-cutting head, the telescoping stick moveable to an operative position along a vertical or near vertical axis, so that the second end extends below a plane defined by a surface the machine is located upon, wherein when in use, the second end may extend into water located below the plane defined by the surface the machine is located upon.

2. A device for harvesting submersed wood comprising a floating platform having a top, a bottom and one or more than one side, a movable boom member having a base end and a pivot end, the base end of the movable boom member pivotally and rotatably mounted to the top of the floating platform, a telescoping stick having a first end, a second end, and a mid portion, the mid portion pivotally attached to the pivot end of the movable boom member, the second end attached to a wood gripping-cutting head, the telescoping stick moveable to an operative position along a vertical or near vertical axis, so that the second end may extend below a plane defined by a surface the floating platform is located upon.

3. The device of claim 2, wherein the movable boom member is mounted on an excavator located upon the top of the floating platform.

4. A method for harvesting submersed wood comprising
   a) positioning, on a land surface and adjacent a water edge, a device for harvesting submersed trees, the device comprising a machine with a movable boom member having a base end pivotally attached to the machine and a pivot end, a telescoping stick having a first end, a second end, and a mid portion, the mid portion pivotally attached to the pivot end of the movable boom member, the second end attached to a wood gripping-cutting head, the telescoping stick moveable to an operative position;
   b) extending the telescoping stick along a vertical or near vertical axis so that the second end enters the water;
   c) engaging the wood gripping-cutting head with a submersed wood;
   d) cutting the submersed wood using the wood gripping-cutting head; and
   e) retrieving the submersed wood.

5. A method for harvesting submersed wood is provided comprising
   a) providing a device comprising a floating platform having a top, a bottom and one or more than one side, a movable boom member having a base end and a pivot end, the base end of the movable boom member pivotally and rotatably mounted to the top of the floating platform, a telescoping stick having a first end, a second end, and a mid portion, the mid portion pivotally attached to the pivot end of the movable boom member, the second end attached to a wood gripping-cutting head, the telescoping stick moveable to an operative position along a vertical or near vertical axis;
   b) engaging the gripping-cutting head with a submersed wood;
   c) cutting the submersed wood using the wood gripping-cutting head; and
   d) retrieving the submersed wood.

6. The device of claim 1, wherein further an orienting system is located at or near the second end to assist in positioning of the wood gripping-cutting head.

7. The device of claim 6, wherein the orienting system is a sonar, video system or echo sounder.

8. The device of claim 2, wherein further an orienting system is located at or near the second end to assist in positioning of the wood gripping-cutting head.

9. The device of claim 8, wherein the orienting system is a sonar, video system or echo sounder.

10. The method of claim 4, wherein further an orienting system is located at or near the second end to assist in positioning of the wood gripping-cutting head.

11. The method of claim 10, wherein the orienting system is a sonar, video system or echo sounder.

12. The method of claim 5, wherein further an orienting system is located at or near the second end to assist in positioning of the wood gripping-cutting head.

13. The method of claim 12, wherein the orienting system is a sonar, video system or echo sounder.

* * * * *